Patented May 31, 1949

2,471,497

UNITED STATES PATENT OFFICE 2,471,497

BONDING CELLULOSE SURFACES

Robert Pierce Roberts and Kenneth Jones, Spondon, near Derby, England, assignors, by mesne assignments, to Celanese Corporation of America, a corporation of Delaware No Drawing. Application June 3, 1943, Serial No. 489,494. In Great Britain June 27, 1942

2 Claims. (Cl. 154—136)

This invention relates to compositions of matter and to the use of such compositions especially in uniting surfaces of wood or other materials composed substantially of cellulose (including regenerated cellulose).

We have found that a valuable method of bonding together surfaces of wood or other materials composed substantially of cellulose is to form a bond of a polyvinyl acetal, especially a polyvinyl formal, between the surfaces. The reaction which results in the formation of the acetal can be carried out by heating the alcohol and aldehyde together in aqueous solution in the presence of an acetalisation catalyst, i. e. a substance which catalyses the condensation of aldehydes with alcohols to form acetals, or which on heating yields a substance which catalyses that condensation.

The acetal may be applied to the surfaces to be joined, in solution in a suitable volatile solvent, for example a chlorinated aliphatic hydrocarbon such as perchlorethylene or trichlorethylene or a liquid aromatic hydrocarbon or mixture of such a hydrocarbon with an alcohol, and the solvent may be evaporated after bringing the surfaces together. Useful results have been obtained with compositions containing the acetal in solution in a mixture of trichlorethylene and ethanol, perchlorethylene and ethanol or benzene and ethanol. Other suitable solvents include alcohols, glycol ethers and glycol esters. Thus for instance useful solvents are aqueous solutions of the methyl-, diemthyl- and ethyl ethers of ethylene glycol.

Although, as indicated above, the acetal can be applied as such to the surfaces to be joined, it is preferable to form the acetal in situ after the surfaces have been brought together. This method can be carried into effect for example by applying in the cold to the surfaces to be joined an aqueous composition containing the alcohol, the aldehyde and a catalyst, bringing the surfaces into contact and heating the assembly. When this method is adopted premature formation of the solid polymer can be avoided by the selection of a suitable substance as catalyst. For example, in the case of a composition containing in aqueous solution about 25% of polyvinyl alcohol and about 12.5% of formaldehyde, the use of hydrochloric acid or sulphur dioxide in the proportion of about 10% on the weight of the polyvinyl alcohol as catalyst causes gelation of the solution in about 15–30 minutes even in the cold. If, however, the hydrochloric acid or sulphur dioxide be replaced by ammonium chloride or hexamethylene tetramine, a composition is obtained which remains liquid for many hours in the cold yet readily becomes solid on heating. Such a composition forms an excellent adhesive for wood and similar materials. The composition can be applied at ordinary temperatures to the articles to be joined, for instance by painting, and after the surfaces to be joined have been brought into contact, a strong permanent join can be made by heating the assembly at 100° C. or 110° C. to 150° C. or 160° C. for several hours. A joint formed in this way between two components of wood, the heating being carried out for about 5 hours at 110° C. is substantially unaffected by treatment for half an hour in boiling water. When the catalyst is omitted from the composition described, no formation of solid polymer occurs even after prolonged heating.

Results similar to those obtained using hydrochloric acid or sulphur dioxide as a catalyst are obtained with other strong mineral acids, for example sulphuric acid, and also with strong organic acids, for example formic acid and the chloracetic acids. It is usually preferable to employ as catalyst a substance such as ammonium chloride or hexamethylene tetramine, which exhibits marked catalytic activity for the reaction only when heated. This property is found in other ammonium salts of strong acids, for example ammonium sulphate. It is usually undesirable however to employ an ammonium salt of a strong acid of low volatility such as sulphuric acid on account of the danger of damage to the materials to be joined, by the acid liberated on heating the salt. Somewhat similar results to those obtained with ammonium chloride and ammonium sulphate might be expected of similar salts of organic nitrogenous bases, e. g. those of arylamines such as aniline, the toluidines and phenylene diamines; of aralkylamines such as benzylamine; of cycloalkylamines such as cyclohexylamine and the lower alkyl cyclohexylamines; of heterocyclic bases such as pyridine, piperidine and piperazine and melamine; of lower alkylamines such as the methylamines, ethylamines and ethylene diamine; and of lower alkylolamines such as the ethanolamines. In fact, however, such salts do not in general possess sufficient catalytic activity even when heated to render them useful substitutes for ammonium chloride.

Compounds capable of liberating sulphur dioxide when heated may be employed, for example the sulphites and bisulphites of sodium and potassium, and the bisulphite compounds of aldehydes and ketones, and especially of the aldehyde which is to be condensed with the alcohol. Reaction products of sulphur dioxide and aldehydes or ketones especially formaldehyde, may also be used.

Acid salts of metals, for example the bisulphates of sodium and potassium and the acid phosphates of these metals, are similar in behaviour to the strong acids referred to, and are preferably avoided when the compositions are required to remain stable for long periods and/or when there is a danger of the materials to which the adhesive is applied being damaged by strong acids. In a similar position are hydrolysable salts of amphoteric metals, for example the chlorides, sulphates and formates, acetates and chloracetates of iron, aluminium, zinc, tin and titanium.

Of the various catalysts referred to, hexamethylene tetramine is outstanding in that, it exhibits so little catalytic activity at ordinary temperatures that compositions in which it is present as the catalyst can still be used even after standing for over a week in the cold, and yet it rapidly brings about the formation of a strong water-resistant bond under the influence of heat without at any stage liberating a strong acid such as might damage the materials to be joined.

The following examples illustrate the invention:

Example I

A solution of the following composition is made, the parts being by weight:

| | Parts |
|---|---|
| Polyvinyl alcohol | 1 |
| Water | 3 |
| 40% aqueous formaldehyde | 1 |
| Hexamethylene tetramine | 0.02 to 0.05 |

This composition is applied to the surfaces of wood laminae which are to be united. The laminae are clamped together with the coated surfaces in contact and the assembly is heated for several hours at about 150° C. The laminae will then be found to be bonded firmly together. The adhesion between the laminae is not destroyed by exposure to boiling water for half an hour. It is not necessary to use the solution within a short time of making it. Thus, for example, the solution specified can still be used after it has stood in the cold for about one week. By this time it may have undergone gelation. The gel may then be liquefied by heating to about 80° C. before application.

Example II

A solution of the following composition is made, the parts being by weight:

| | Parts |
|---|---|
| Polyvinyl alcohol | 30 |
| Water | 40 |
| 40% aqueous formaldehyde | 30 |

Sulphur dioxide is bubbled into the solution until a weight increase of about 5 to 10% on the weight of the polyvinyl alcohol has been obtained. The resulting liquid composition is employed in the same way as the composition of Example I. The catalyst in this composition however, is more powerful than of Example I and in consequence the composition cannot be allowed to stand for so long before application and when applied requires a shorter heat treatment to set it.

Example III

A composition identical with that of Example II, but containing 1 to 4 parts of ammonium chloride in place of the sulphur dioxide, is made. This composition is employed in the same way as the composition of Example I.

Example IV

Polyvinyl alcohol is reacted with the formaldehyde in the presence of hydrochloric acid to produce the formal of the alcohol. This is dissolved in a mixture of equal volumes of benzene and ethanol to give a 25% solution by weight. This solution is applied in the same way as the solutions of the preceding examples, and hardening is effected by heating at about 110° C. for about 5 hours.

Instead of carrying out the acetalisation of the polyvinyl alcohol in an aqueous medium, other hydroxyl-containing media can be employed, for example lower aliphatic alcohols such as methanol or ethanol, and the invention includes compositions containing the polyvinyl alcohol (or other polyvinyl compound capable of yielding an acetal by reaction with an aldehyde) together with the aldehyde and the catalyst in alcoholic or aqueous-alcoholic solution. Examples of such other polyvinyl compounds are given below.

The polymer may also be applied in the form of an aqueous dispersion. In making such dispersions a wide choice of dispersing agents is available among which may be mentioned the alkali metal salts and ammounium salts of sulphonated aryl hydrocarbons, aralkyl hydrocarbons and esters of dicarboxylic acids, and of alkyl or aralkyl sulphuric esters. The dispersion may be made by dissolving the polymer in a solvent which is miscible or immiscible with water and adding water to the solution in the presence of a dispersing agent.

The application of preformed films of the acetal to the surfaces to be joined even when such films are plasticized and moistened with a volatile solvent has not been found to give results in any way comparable with those of the other methods described.

The polyvinyl alcohol employed may be derived, for example, by the complete saponification of polyvinyl acetate. On the other hand, we may employ polyvinyl compounds obtained by incomplete saponification of polyvinyl acetate or by saponification (complete and incomplete) of other polyvinyl esters, for example polyvinyl formate, polyvinyl propionate, polyvinyl butyrate and lower alkyl substitution products of such esters, for instance methyl vinyl acetate. The polyvinyl ester may have been saponified, for example, until 75–95%, for instance 80–90%, of the acidyl groups are removed. Polymers of other unsaturated alcohols can be employed in place of polyvinyl alcohols, for instance of allyl alcohol and crotyl alcohol. Acetalisation of the alcohol can even be effected simultaneously with the production of the alcohol by saponification of a polyvinyl ester. Preferably the alcohol should be water soluble, but this is not essential provided that it can be dissolved in a suitable volatile solvent.

Instead of formaldehyde other active aldehydes can be used, for instance acetaldehyde, benzaldehyde, butyraldehyde, acrolein and furfural. According to a modification of the invention, ketones, especially acetone and other lower aliphatic ketones, can be employed instead of aldehydes.

The invention is of special importance in building up composite materials from plies of wood or fabric (including paper) having a basis of cellulose, especially regenerated cellulose of high tenacity, alternating with layers of the polymer. Composite materials built up from very thin layers of wood, for example layers of thickness from 0.001–0.04" and especially from 0.002–0.01", are particularly valuable since such materials can readily be formed under heat and pressure into curved shapes. In building up such composite materials it is of advantage for the grain of each ply of wood to be at right angles to that of the adjacent plies of wood. Among fabrics suitable for the production of composite materials of the kind referred to, fabrics formed of regenerated cellulose yarns of high tenacity, for example 2–3 or 4 grams per denier or more, such as can be obtained by the complete saponification of yarns of cellulose acetate or other organic ester of cellulose which have been stretched considerably under the influence or steam, hot water or an organic stretch-assisting agent, are of particular value. In such fabrics warp and weft may be equally strong, or fabrics having a higher strength warpwise than weftwise may alternate with fabrics having a higher strength weftwise than warpwise.

Composite materials such as those described above are of special importance in connection with aircraft construction on account of their high ratio of tenacity to specific gravity. They may be employed, for instance, in the construction of air-screws, wing sections, ailerons and fuselage sections. Those composite materials in which the cellulose component is wood, are also of value in the construction of spars and similar aircraft components. They may also be employed in the construction of boat hulls and sea-plane floats. The composite materials may be built up in situ or may be preformed and bent or moulded into the desired forms.

In a similar way, the methods of the invention and the compositions used in carrying out these methods may be used in uniting surfaces other than those of natural cellulose or regenerated cellulose, for example surfaces of cellulose derivatives, for instance cellulose acetate, cellulose propionate, cellulose butyrate, cellulose acetate-propionate, cellulose acetate-butyrate, cellulose acetate-stearate, ethyl cellulose and benzyl cellulose and ethyl cellulose acetate; surfaces of synthetic resin, for example condensation-polymers of aldehydes with urea and its derivatives or with phenols, and polymers of vinyl acetate, methyl acrylate, methyl methacrylate and similar vinyl compounds; surfaces of leather; animal fibres; and metallic surfaces. Composite materials can be formed using fabrics, films or sheets of cellulose derivatives or other thermoplastic film-forming or filament-forming materials alternating with layers of the polyvinyl acetal or the like.

The methods of the invention can also be used in uniting materials of cellulose to other materials, for instance cellulose derivatives, synthetic resins, leather, animal fibre and metals.

The invention includes the novel compositions described as well as the use of these compositions, and the composite materials made therefrom.

Having described our invention, what we desire to secure by Letters Patent is:

1. Process for bonding together surfaces of material composed substantially of cellulose which comprises applying to said surfaces a composition containing polyvinyl alcohol, formaldehyde and hexamethylene tetramine the molecular ratio of formaldehyde to $CH_2CHOH$ groups of polyvinyl alcohol being between 1.15:2 and 1.5:2 and the proportion of hexamethylene tetramine employed being 2 to 5% on the weight of polyvinyl alcohol, bringing the surfaces together, and effecting acetalization of the alcohol by the aldehyde under the influence of heat so as to form in situ a strong bond uniting the surfaces.

2. A composition suitable for bonding together surfaces of material composed substantially of cellulose, said composition comprising an aqueous solution of polyvinyl alcohol, formaldehyde and hexamethylene tetramine the molecular ratio of formaldehyde to $CH_2CHOH$ groups of polyvinyl alcohol being between 1.15:2 and 1.5:2 and the proportion of hexamethylene tetramine employed being 2 to 5% on the weight of polyvinyl alcohol, said solution being adapted to be applied in the liquid state to the surfaces to be joined and to be hardened by heat.

ROBERT PIERCE ROBERTS.
KENNETH JONES.

REFERENCES CITED

The following references are of record in the file of this patent:

UNITED STATES PATENTS

| Number | Name | Date |
|---|---|---|
| 1,125,973 | Davidson | Jan. 26, 1915 |
| 1,905,999 | Ellis | Apr. 25, 1933 |
| 2,162,678 | Robertson | June 13, 1939 |
| 2,173,781 | Gibello | Sept. 19, 1939 |
| 2,261,983 | Ford | Nov. 11, 1941 |
| 2,328,057 | Coulter | Aug. 31, 1943 |
| 2,438,176 | Lantz et al. | Mar. 23, 1948 |

OTHER REFERENCES

"Industrial Chemistry," by Riegel, published 1942 by Reinhold Publishing Co., 330 West Forty-second St., New York, N. Y.; page 194.

"The Chemistry of Synthetic Resins," Ellis, vol. II (the Subject Index), published in 1935 by Reinhold Publishing Co., 330 W. 42d St., New York, N. Y.; pages 1060-1-2, 1469 and 1524.